D. L. LINDQUIST.
CONTROLLING MECHANISM FOR INDUCTION MOTORS.
APPLICATION FILED MAR. 7, 1911.

1,190,923.

Patented July 11, 1916.
2 SHEETS—SHEET 1.

Witnesses:
J. F. Rule.
Ernest L. Gale Jr.

Inventor:
David L Lindquist
By J. A. Campbell
his Attorney

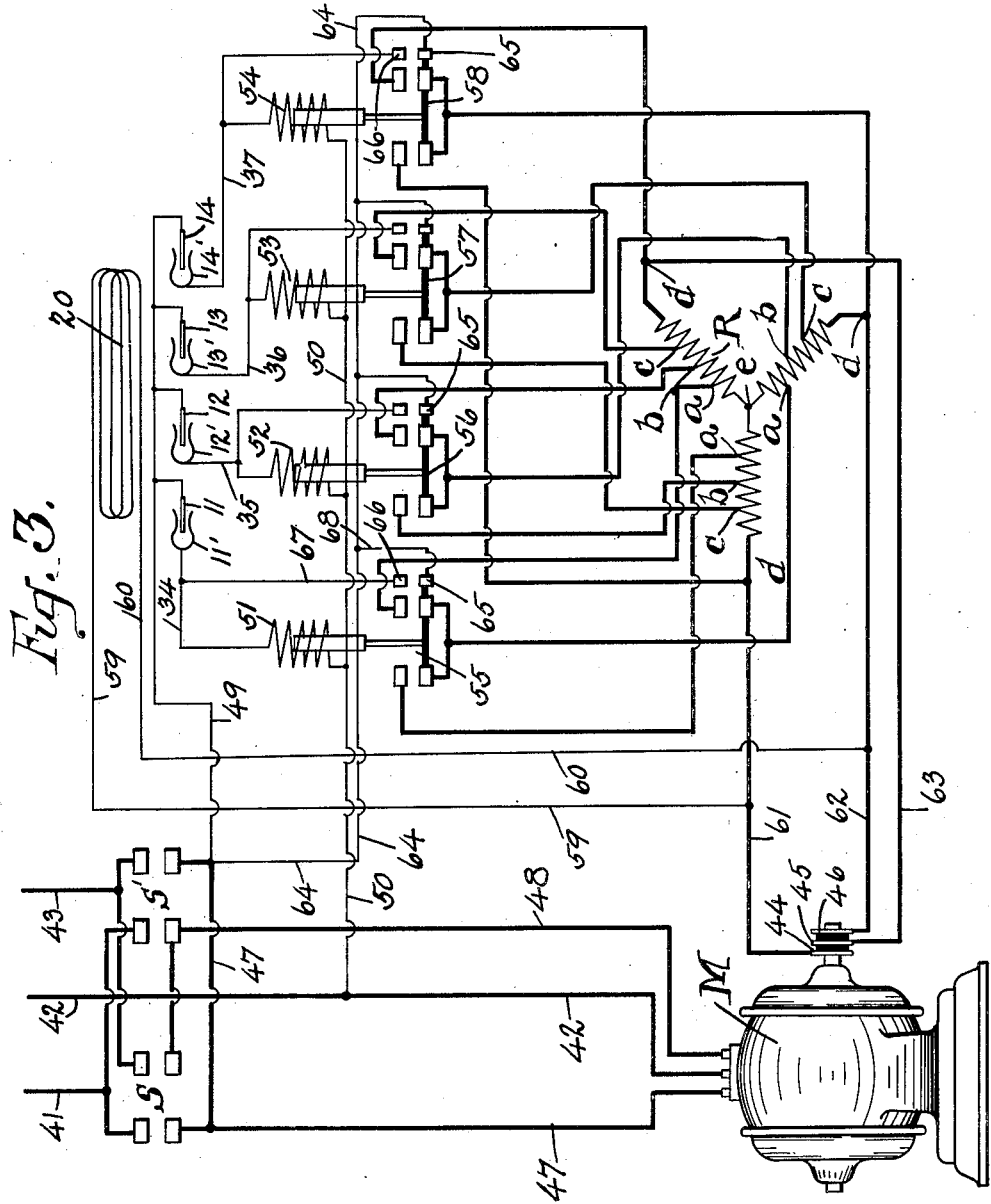

UNITED STATES PATENT OFFICE.

DAVID L. LINDQUIST, OF YONKERS, NEW YORK, ASSIGNOR TO OTIS ELEVATOR COMPANY, OF JERSEY CITY, NEW JERSEY, A CORPORATION OF NEW JERSEY.

CONTROLLING MECHANISM FOR INDUCTION-MOTORS.

1,190,923.  Specification of Letters Patent.  Patented July 11, 1916.

Application filed March 7, 1911. Serial No. 612,872.

*To all whom it may concern:*

Be it known that I, DAVID L. LINDQUIST, a subject of the King of Sweden, residing at Yonkers, in the county of Westchester and State of New York, have invented a new and useful Improvement in Controlling Mechanism for Induction-Motors, of which the following is a specification.

My invention relates to means operated by a periodic current and controlled by the frequency of the current variations, and is particularly adapted to accelerating and controlling mechanism for an alternating current electric motor.

An object of the invention is to provide means for controlling the acceleration of an alternating current motor by the frequency of the current alternations in the rotor circuits.

Another object of the invention is to provide electro-responsive mechanism responsive to current fluctuations of given frequencies and adapted for the control of a motor or for other purposes.

Other objects of the invention and the exact nature thereof will appear hereinafter.

Figure 1:
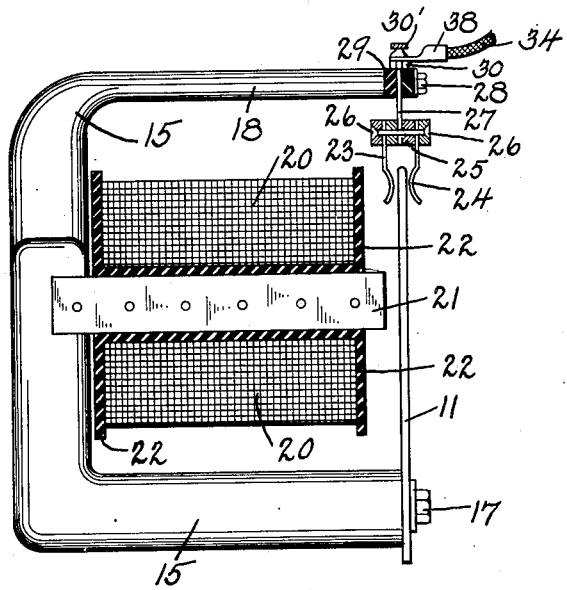
Figure 2:
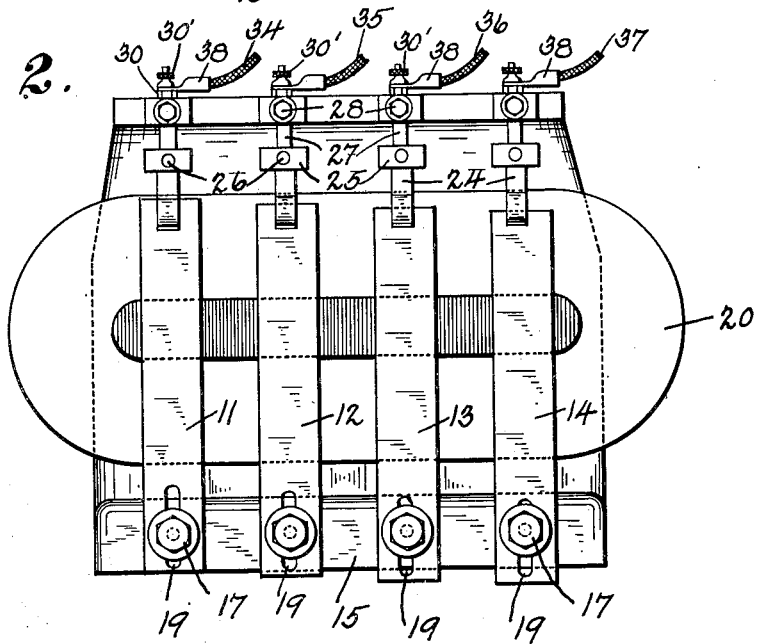

In the accompanying drawings, Figure 1 is a side elevation partly in section of an accelerating magnet constructed in accordance with my invention; Fig. 2 is a front elevation view of the same; and Fig. 3 is a diagrammatic view of motor controlling mechanism embodying my invention.

In the operation of an induction motor, the alternations of current in the secondary winding of the revolving secondary type of motor decreases from a maximum to the minimum value as the speed of the motor is changed from zero to the full or synchronous speed. That is, when the motor is at a standstill, the alternations of current in the secondary winding are the same in number as the alternations of current in the primary winding. As the speed of rotation of the rotor and the secondary winding is increased, the difference between the alternations of current in the secondary winding and the alternations in the primary winding becomes more and more until the motor has attained its full speed. My invention utilizes this principle for accomplishing the results as hereinafter set forth.

Another physical principle embodied herein is, that the oscillations of a vibrating member may be amplified by the sympathetic vibration of another member, or may be reinforced or intensified by waves or impulses that are of the same frequency as the oscillations of the vibrating member. When these impulses are not of the same frequency they interfere with the oscillations of the vibrating member and cause the oscillations to be decreased in amplitude and sometimes totally annulled.

Referring now to Figs. 1 and 2, a magnet constructed in accordance with the principles of my invention is shown as having four blades or vibrating members 11, 12, 13, 14, although any desired number may be employed in a similar way. These blades are secured to the magnet frame 15 by the bolts 17 which extend through the slotted openings 19 in the blades. The openings 19 are elongated, to permit longitudinal adjustment of the blades, thus providing means for accurately setting each blade for the exact frequency of vibration desired. The magnet comprises a magnet winding 20 on a spool 22 of insulating material mounted on a laminated iron core 21. The vibrating blades are made of magnetic material and extend in front of the iron core 21 which is secured to the magnet from 15 or the blades may be made of non-magnetic material and secured to magnetic armatures carried in front of the core 21, the blades having preferably a high coefficient of resiliency or elasticity. When an alternating current flows in the winding, the blades will receive impulses in accordance with the frequency of the alternating current. Each blade has a different normal period of vibrations due to its size, shape, weight and length and when an alternating current of a frequency corresponding to that of a given blade flows in the magnet winding 20, the amplitude of oscillation of that blade is greatly increased. The magnet frame 15 is provided with an extension 18 forming a support for a series of clip holders 25. A pair of spring clips 23, 24 is secured to each of said holders by means of a rivet or bolt 26. Springs 27 and bolts 28 connect the holders 25 with the extension 18, insulation 29 being interposed between the said extension and the springs 27. Conductors 34, etc. are electrically connected through terminal lugs or connectors 38, the springs 27 and bolts 26, to the clips 23, 24. Adjusting nuts 30 and thumbscrews 30′ are threaded on the upper ends of the spring rods 27 and form a means for adjusting the position of the clips 23, 24 and also to clamp the terminal lugs 38. These contact clips 23 and 24 are so spaced with respect to the vibratory blades that the ordinary oscillations of the several vibrating blades are not sufficient to contact the blades with the clips, but when the oscillations are amplified by impulses from the magnet that are in synchronism with the oscillations, the blade will come in contact with the corresponding clip 23 or 24, and an electrical circuit will thereby be closed to some operative device. It is evident that by having blades of different frequency of vibration, variation of the frequency of the alternating current supplied to the magnet winding will cause contacts to be made in a corresponding order of sequence.

Referring now to Fig. 3, an example of the application of my invention as employed to cut out the starting resistance of a wound rotor induction motor, will be explained. This successive closing of the contacts may be utilized in various other ways, but is especially applicable to the acceleration of an induction motor. The motor M (Fig. 3) is connected to the mains 41, 42, 43, through the reversing switches S or S', in a well-known manner, and the starting resistance R is connected to the rotor windings by means of the slip rings 44, 45, 46 and the conductors 61, 62, 63, in the ordinary well known manner. The contact blades and clips of my accelerating magnet are represented by the devices 11, 12, 13, 14 and 11', 12', 13', 14'. The magnet winding 20 is connected by conductors 59 and 60 to the rotor winding leads 61 and 62.

For accelerating magnet windings 51, 52, 53, 54 are shown which operate the four accelerating switches 55, 56, 57, 58, and these switches are arranged to be operated in succession by the closing of circuits through the blades 11, 12, 13 and 14 respectively. Each accelerating switch carries a contact 65 which makes connection with a fixed contact 66 as soon as the accelerating switch is operated, thus maintaining a closed circuit through the magnet winding, not dependent upon the circuit through the vibrating blade and the slip after such circuit has been once closed. The closing of each accelerating switch short circuits a portion of the starting resistance R in a well known way. The motor M is started by closing one of the reversing switches S or S'. Current is thereby induced in the rotor winding which is restricted by the starting resistance R. The magnet winding 20 being in circuit with a winding of the rotor also receives current, the circuit for said magnet winding being traced from the slip ring 44 through wires 61, 59, winding 20 and wires 60, 62 to slip ring 46. While the motor is at rest, the frequency of this induced current is the same as that of the primary, but when the motor starts and accelerates the frequency of the induced current decreases at the same rate as the speed of the rotor increases. The frequency of this induced current is therefore gradually reduced as the motor speeds up until it is the same as the normal rate of vibration of the first blade 11, and the latter is operatively oscillated to make contact with the clip 11', thereby closing an energizing circuit through the accelerating magnet winding 51 which circuit is from the motor lead wire 47, through wire 49, blade 11, clip 11', wire 34, winding 51 and wire 50 to the motor lead wire 42. When current flows through this winding 51, the accelerating switch 55 is closed, thereby short circuiting the portion ae of each section of the starting resistance R in the ordinary way. The auxiliary contacts 65 and 66 are connected when the switch 55 closes and a permanent holding circuit is closed through the winding 51 from the motor lead wire 47 through wires 64, 68, contacts 65, 66, wires 67, 34, winding 51, wire 50, to the motor lead wire 42. Thus it is seen that as soon as an instantaneous circuit is completed through the vibrating blade 11 and the contact clip 11', the reversing switch 55 is closed, and the auxiliary contacts 65, 66 establish a permanent holding circuit through the magnet coil 51. The remaining accelerating switches 56, 57, 58, are closed in the order named, in a similar manner, each by its operation short-circuiting a portion of the starting resistance until by the operation of the last named switch 58, the entire starting resistance R is cut out, and the secondary winding is short-circuited. When it is desired to stop the motor, the reversing switch is opened and the current supply for the accelerating switches is thereby cut off, causing them to be returned to their initial position ready for the next starting up of the motor.

It is evident that the accelerating switches might be arranged to operate in any desired succession, or simultaneously, and may be applied to uses other than short-circuiting resistance as herein shown. And although my invention is especially adapted for use with an induction motor of the type herein described, it is also evident that the blades may be operatively oscillated in any desired succession whenever the current in the magnet winding 20 is subject to the necessary changes in frequency. It is also evident that the oscillating blades may be varied in number, and that a separate magnet may be used for each blade in place of the single magnet for all of the blades. Various other changes may be made in the construction, combination, and arrangement of the several parts by those familiar with the art, without interfering with the spirit and scope of the invention. It is to be further noted that my invention is not confined to an electromagnet as disclosed, either alone or in combination with an electric motor, but comprehends the idea broadly of controlling the acceleration and operation of an electric motor by means dependent on the frequency of current alternations in a circuit of the motor.

What I claim and desire to secure by Letters Patent of the United States is:—

1. The combination of an electric motor, a source of alternating current of constant frequency for the motor, and vibratory means having a high coefficient of resiliency controlled by the periodicity of current induced in a circuit of the motor for controlling the speed of the latter.

2. The combination of an alternating current electric motor, a source of alternating current of constant frequency for the motor, and vibratory means having a high coefficient of resiliency controlled by the frequency of current alternations in a circuit of the motor to control the speed of the motor.

3. An alternating current electric motor of the induction type, in combination with a source of alternating current of constant frequency for the motor, and vibratory means having a high coefficient of resiliency controlled by the frequency of a current induced in a winding of the motor to control the speed of said motor.

4. The combination of an alternating current electric motor of the induction type, a source of current supply therefor of constant frequency, accelerating apparatus for the motor, and vibratory means having a high coefficient of resiliency controlled by the frequency of current alternations in a secondary circuit of the motor for effecting the operation of said accelerating apparatus.

5. The combination of an alternating current electric motor comprising a stator and a rotor, starting resistance, and vibratory means having a high coefficient of resiliency dependent upon the frequency of current alternations in a circuit of the rotor to effect the cutting out of the starting resistance.

6. The combination of an alternating current electric motor, an electro-responsive vibratory device having a high coefficient of resiliency operatively responsive only to current alternations of a given frequency and arranged within the influence of an induced current of the motor whose frequency varies as the speed of the motor, and motor controlling apparatus controlled by the said electro-responsive device.

7. The combination of an alternating current induction motor comprising a stator and a rotor, an electro-responsive device comprising a resilient vibratory member within the influence of a current of a frequency which varies with the speed of the motor and responsive to current alternations of a given frequency only, starting resistance for the motor, and means controlled by said electro-responsive device for cutting out the starting resistance.

8. The combination of an alternating current electric motor comprising a stator and a rotor, a plurality of electro-responsive devices responsive to current impulses of different frequencies dependent on the speed of the motor and operative successively each in response to a predetermined frequency as the motor accelerates, and accelerating mechanism controlled by said electro-responsive devices.

9. The combination of an alternating current motor comprising a stator and a rotor, a plurality of electro-responsive devices within the influence of a current induced in the rotor and each susceptible to current alternations of a given frequency and arranged to operate successively each in response only to current of said frequency as the speed of the rotor increases, and accelerating mechanism controlled by said electro-responsive devices.

10. The combination of an alternating current induction motor comprising a stator and a rotor, starting resistance in circuit with the rotor, and a plurality of electro-responsive devices comprising resilient vibratory members dependent for operation directly upon the frequency of current alternations in the rotor and operative successively to cut out the starting resistance as the motor accelerates.

11. The combination of an alternating current motor, accelerating apparatus, and means comprising a resilient vibratory member dependent on and controlled by the changing frequency of current impulses in a circuit of the motor due to a variation in motor speed for operating said accelerating apparatus.

12. The combination of an electric motor adapted to be operated from an alternating current supply of constant frequency, and means comprising a resilient vibratory member responsive to the varying frequency of the secondary of the motor for effecting the control of the motor.

13. The combination of an alternating current electric motor, an electromagnet in circuit with a secondary winding of the motor, a device comprising a resilient vibratory member operatively responsive to magnetic fluctuations in said magnet of a given periodicity only, and means controlled by said device for controlling the speed of the motor.

14. The combination of an alternating current motor comprising a stator and a rotor, an electromagnet in circuit with a winding of the rotor, a vibratory member having a normal rate of vibration, and arranged to respond to magnetic fluctuations in said electromagnet when the latter and said vibratory member are in synchronism, and motor accelerating means controlled by said vibratory member.

15. The combination of an alternating current electric motor comprising a stator and a rotor, a plurality of vibratory members each having a normal rate of vibration, means for producing magnetic fluctuations corresponding in frequency to the current alternations in the rotor, said vibratory members being located within the fluctuating magnetic field and each responsive to magnetic fluctuations corresponding to its normal rate of vibration, and accelerating apparatus controlled by said vibratory members.

16. The combination of an induction motor, an electromagnet which receives its energizing current from the secondary of the motor, vibratory blades actuated by magnet impulses in the said electro-magnet, and each controlled by a predetermined frequency in said motor secondary, contacts co-acting with the said vibratory blades, and circuits associated with said vibratory blades and coacting contacts for controlling the motor.

17. The combination of an induction motor, an electromagnet which receives its energizing current from the secondary winding of the motor, vibratory blades each responsive to a predetermined frequency in said secondary winding, electro-responsive mechanism for controlling the motor, and means controlled by the said blades for effecting the operation of the electro-responsive mechanism to control the motor in accordance with the varying frequency of the secondary winding of the motor.

18. The combination of an induction motor, an electromagnet which receives its energizing current from the secondary winding of the motor, vibratory blades of different frequencies of vibration, contacts coacting with each blade, and electrical circuits for controlling the motor associated with the said coacting blades and contacts whereby the blades will contact with the corresponding contacts in successive order when the frequency of the secondary of the motor changes to correspond with the frequency of vibration of the blades.

19. The combination of an induction motor, an electromagnet energized from the secondary of the motor and arranged to control the motor, vibratory members controlled by said magnet and having different normal frequencies of vibrations, and contacts associated with the blades, the vibratory blades being operatively contacted with their corresponding contacts when the frequency of current in the secondary of the motor corresponds with the normal frequency of vibration of the blades as the speed of the induction motor increases.

20. The combination of an induction motor, an electromagnet which receives its energizing current from the secondary winding of the induction motor, vibratory blades of different frequencies of vibration, contact clips for each blade, and magnet windings which receive energizing current when the vibratory blades connect with the contact clips, the operation of the blades being dependent upon the change of frequency of the current in the said secondary winding for connecting the blades with the contact clips to energize the magnet windings in regular succession.

21. The combination of an induction motor, an electromagnet which receives its energizing current from the secondary winding of the induction motor, vibratory blades of different frequencies of vibration, contact clips, magnet windings, accelerating switches closed by current flowing in the magnet windings, the operation of the vibratory blades being dependent upon the change of speed of the induction motor for causing the said blades to connect with the contact clips in regular succession, thereby causing current to flow in the magnet windings.

22. The combination of an induction motor, an electromagnet which receives its energizing current from the secondary winding of the induction motor, vibratory blades, contact clips, electro-magnetic accelerating switches, starting resistance for the motor, said vibratory blades being within the influence of said electromagnet and dependent upon the speed of the induction motor for contacting with the contact clips to energize the accelerating switch magnets in succession, and an auxiliary contact which completes a holding circuit through each accelerating switch magnet winding as soon as the accelerating switch operates.

In testimony whereof, I have signed my name to this specification in the presence of two subscribing witnesses.

DAVID L. LINDQUIST.

Witnesses:
EDWARD H. STEELE,
GEORGE D. ROSE.